(12) United States Patent
Hwang et al.

(10) Patent No.: US 10,223,351 B2
(45) Date of Patent: *Mar. 5, 2019

(54) TEXT PREDICTION USING MULTIPLE DEVICES

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,416

(22) Filed: May 8, 2018

(65) Prior Publication Data

US 2018/0246874 A1    Aug. 30, 2018

Related U.S. Application Data

(63) Continuation of application No. 15/811,994, filed on Nov. 14, 2017, now Pat. No. 9,996,524, which is a continuation of application No. 15/419,545, filed on Jan. 30, 2017.

(51) Int. Cl.
*G06F 17/27* (2006.01)
*H04W 4/14* (2009.01)
*G06F 3/01* (2006.01)

(52) U.S. Cl.
CPC ............ *G06F 17/276* (2013.01); *H04W 4/14* (2013.01); *G06F 3/01* (2013.01); *G06F 3/013* (2013.01); *G06F 17/2735* (2013.01)

(58) Field of Classification Search
CPC ........... G06F 17/27; G06F 17/30; G06K 9/00; H02N 13/04; G10L 15/26; G10L 15/00
See application file for complete search history.

(56) References Cited

U.S. PATENT DOCUMENTS

| | | |
|---|---|---|
| 8,903,718 B2 | 12/2014 | Akuwudike |
| 8,904,442 B2 | 12/2014 | Begeja et al. |
| 9,244,905 B2 | 1/2016 | Joshi et al. |

(Continued)

FOREIGN PATENT DOCUMENTS

| | | |
|---|---|---|
| WO | 2008085736 A1 | 7/2008 |
| WO | 2016082895 A1 | 6/2016 |
| WO | 2016192762 A1 | 12/2016 |

OTHER PUBLICATIONS

Henry, A., "How Predictive Keyboards Work (and How You Can Train Yours Better)," lifehacker.com, Oct. 8, 2014, 114 pages. http://lifehacker.com/how-predictive-keyboards-work-and-how-you-can-train-yo-1643795640.

(Continued)

*Primary Examiner* — Shreyans A Patel
(74) *Attorney, Agent, or Firm* — Nathan M. Rau

(57) ABSTRACT

A first set of characters may be received in response to a user input for text prediction. An estimate may be generated indicating what second set of characters will be inputted. The generating an estimate may be based on at least receiving data from a second user device. At least some of the data may not be located within the second user device's text dictionary. At least some of the data may be provided to the first user device.

1 Claim, 9 Drawing Sheets

(56) References Cited

U.S. PATENT DOCUMENTS

| | | | |
|---|---|---|---|
| 9,256,784 B1* | 2/2016 | Taylor | G06K 9/00597 |
| 9,424,246 B2 | 8/2016 | Spencer et al. | |
| 2008/0168366 A1 | 7/2008 | Kocienda et al. | |
| 2008/0195388 A1* | 8/2008 | Bower | G06F 3/0237 |
| | | | 704/243 |
| 2008/0243834 A1 | 10/2008 | Rieman et al. | |
| 2009/0174667 A1 | 7/2009 | Kocienda et al. | |
| 2010/0100568 A1 | 4/2010 | Papin et al. | |
| 2012/0197857 A1* | 8/2012 | Huang | G06F 3/0488 |
| | | | 707/706 |
| 2012/0206323 A1 | 8/2012 | Osterhout et al. | |
| 2013/0080162 A1* | 3/2013 | Chang | G10L 15/34 |
| | | | 704/235 |
| 2013/0188887 A1 | 7/2013 | Chan et al. | |
| 2013/0253908 A1* | 9/2013 | Zhai | G06F 17/276 |
| | | | 704/9 |
| 2014/0365875 A1 | 12/2014 | De Assuncao et al. | |
| 2015/0134326 A1* | 5/2015 | Bell | G06F 17/276 |
| | | | 704/9 |
| 2015/0317078 A1 | 11/2015 | Kocienda et al. | |
| 2016/0093301 A1 | 3/2016 | Bellegarda et al. | |
| 2016/0198319 A1 | 7/2016 | Huang et al. | |
| 2017/0039426 A1 | 2/2017 | Brooks et al. | |
| 2017/0052703 A1 | 2/2017 | Bi | |

OTHER PUBLICATIONS

Lee, N., "Please don't send me Smart Replies," engadget.com, May 19, 2016, 9 pages. https://www.engadget.com/2016/05/19/google-smart-replies-are-dehumanizing/.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Hwang et al., "Text Prediction Using Captured Image from an Image Capture Device," U.S. Appl. No. 15/419,606, filed Jan. 30, 2017.

Hwang et al., "Text Prediction Using Captured Image from an Image Capture Device," U.S. Appl. No. 15/811,925, filed Nov. 14, 2017.

Hwang et al., "Text Prediction Using Multiple Devices," U.S. Appl. No. 15/419,545, filed Jan. 30, 2017.

Hwang et al., "Text Prediction Using Multiple Devices," U.S. Appl. No. 15/811,994, filed Nov. 14, 2017.

Hwang et al., "Text Prediction Using Multiple Devices," U.S. Appl. No. 15/974,449, filed May 8, 2018.

List of IBM Patents or Patent Applications Treated as Related, signed May 8, 2018, 2 pages.

* cited by examiner

TEXT PREDICTION USING MULTIPLE DEVICES

BACKGROUND

This disclosure relates generally to text input systems, and more specifically, to predicting characters based at least on locating character(s) within multiple devices.

The rise in mobile technology and communication needs have resulted in the growth of various communication protocols/mechanisms, such as Short Message Service (SMS), Multimedia Messaging Service (MMS), instant messaging, etc. As such, users may utilize keyboards (e.g., virtual keyboards) or other user interfaces to input various characters in order to communicate with other users or propose a query. Inputting individual text characters can be arduous for users. One mechanism utilized to overcome this is the implementation of predictive text input. Predictive text input predicts characters, such as a word, that a user will type based on receiving limited input from the user. Typically, when a user inputs a few characters of a word, for example, a dictionary (e.g., a word database) stored in the same device's memory is looked up in order to estimate what words the user will type and present them as suggestions to the user. The user may then select the suggestions to insert into a text field. This potentially reduces the number of times a user has to input individual characters in order to complete the word.

SUMMARY

One or more embodiments are directed to a computer-implemented method, a system, and a computer program product. A first user device may receive a first set of one or more characters in response to an input. The first user device may predict a second set of one or more characters that will be inputted. The predicting may be based on at least receiving information that is displayed to a second user device. At least the second set of characters may be provided to the first user device.

Figure 1:
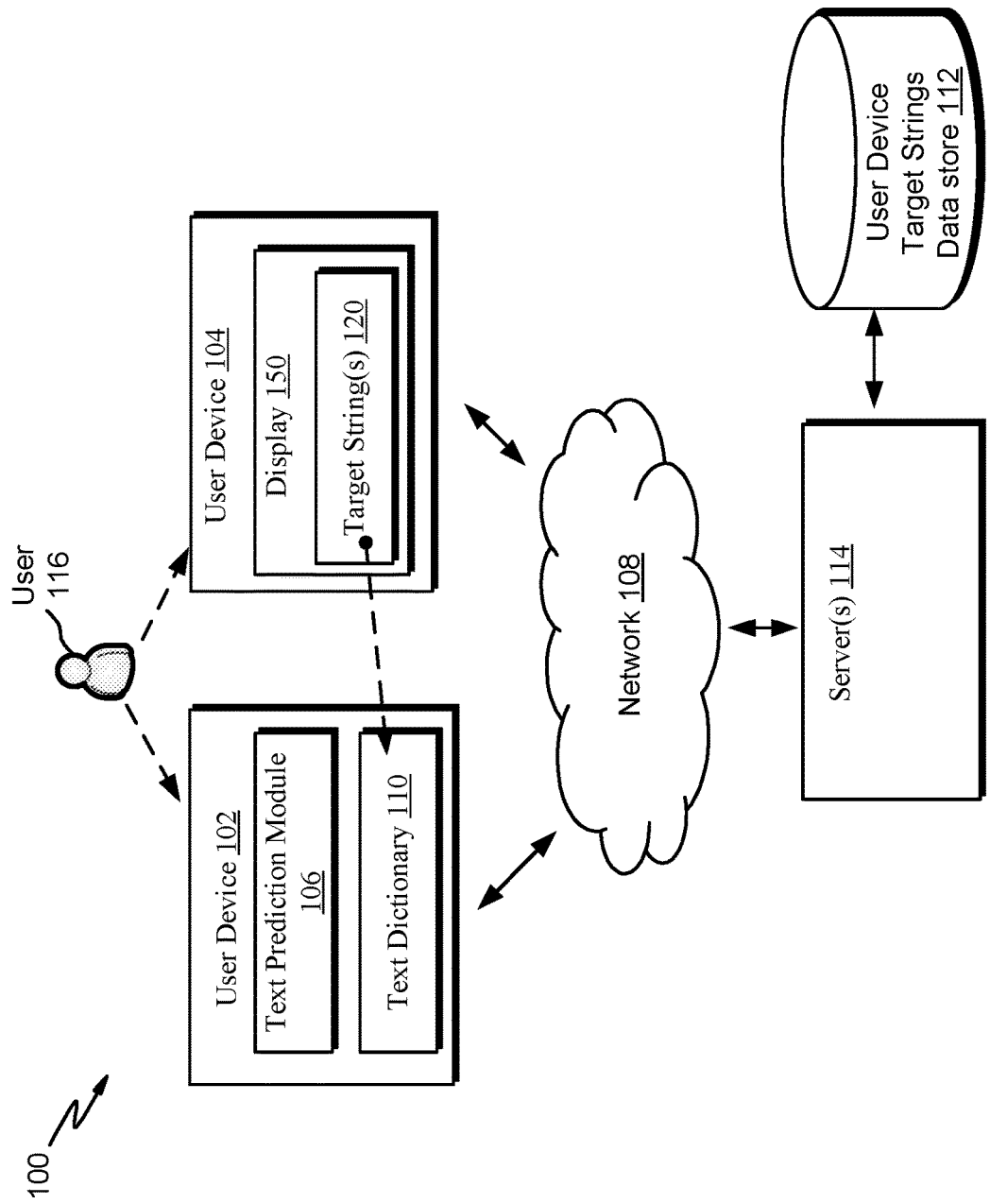
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to predicting characters based at least on using non-local data. While the present disclosure is not necessarily limited to such applications, various aspects of the disclosure may be appreciated through a discussion of various examples using this context.

In various instances, predictive text input today may be inconvenient, error-prone, and lack a robust corpus of data for prediction. One such instance arises when a user desires to input a string that is not recognized or located in any of the dictionaries in any of the user's devices. For example, users may input characters of a first string on a first device, but the entire first string may only be displayed/stored to a second device owned by the same user. However, the first string may not be located within the second device's text dictionary (e.g., because the first string may only be displayed on an open window of the second device). In an illustrative example, a user may own both a mobile phone and a laptop computing device. On the laptop computing device, an application, such as a web browser, may store or display atypical information (e.g., information that is not located in a dictionary for input) of the user, such as user-generated passwords, authentication codes (e.g., One-time Passwords (OTP)), Universal Unique Identifiers (UUID), serial numbers, recovery codes, payment information, phone numbers, addresses, and/or any other private information. However, if the user desires to input such atypical information on his/her mobile phone (the second user device), the user may have to manually input this information verbatim in order to store this information to the mobile device, which may be arduous. This is because neither text libraries on the first or second devices may store this information. Recovery codes, for example, may contain 36 or more characters and so typing these characters individually multiple times may become burdensome.

In some situations, a user may use another user's device (e.g., a spouse's device) to input characters on. In these situations, a user may query his/her device in order to obtain character(s) from his/her device for use in text prediction on the other user's device. Alternatively, if the user is utilizing his/her device, the user may query another user's device in order to obtain one or more characters for text prediction.

In some embodiments, remote data stores and/or secondary user devices may be accessed in order to store one or more characters (e.g., letters, numbers, and/or symbols) to a user device's dictionary. These characters may be obtained at run time and/or at particular event/time intervals, as described in more detail below. In some embodiments, various other remote devices may also be queried in order perform text prediction at near real-time, as described in more detail below.

FIG. 1 is a block diagram of a computing environment 100, according to embodiments. The computing environment 100 includes the user device 102 and user device 104, each of which are communicatively coupled (e.g., via the network 108) to the server(s) 114. In some embodiments, the computing environment 100 may be implemented within a cloud computing environment, or use one or more cloud computing services, such as the cloud computing environment 50 of FIGS. 7, 8, and 9, which is described in more detail below.

Figure 8:
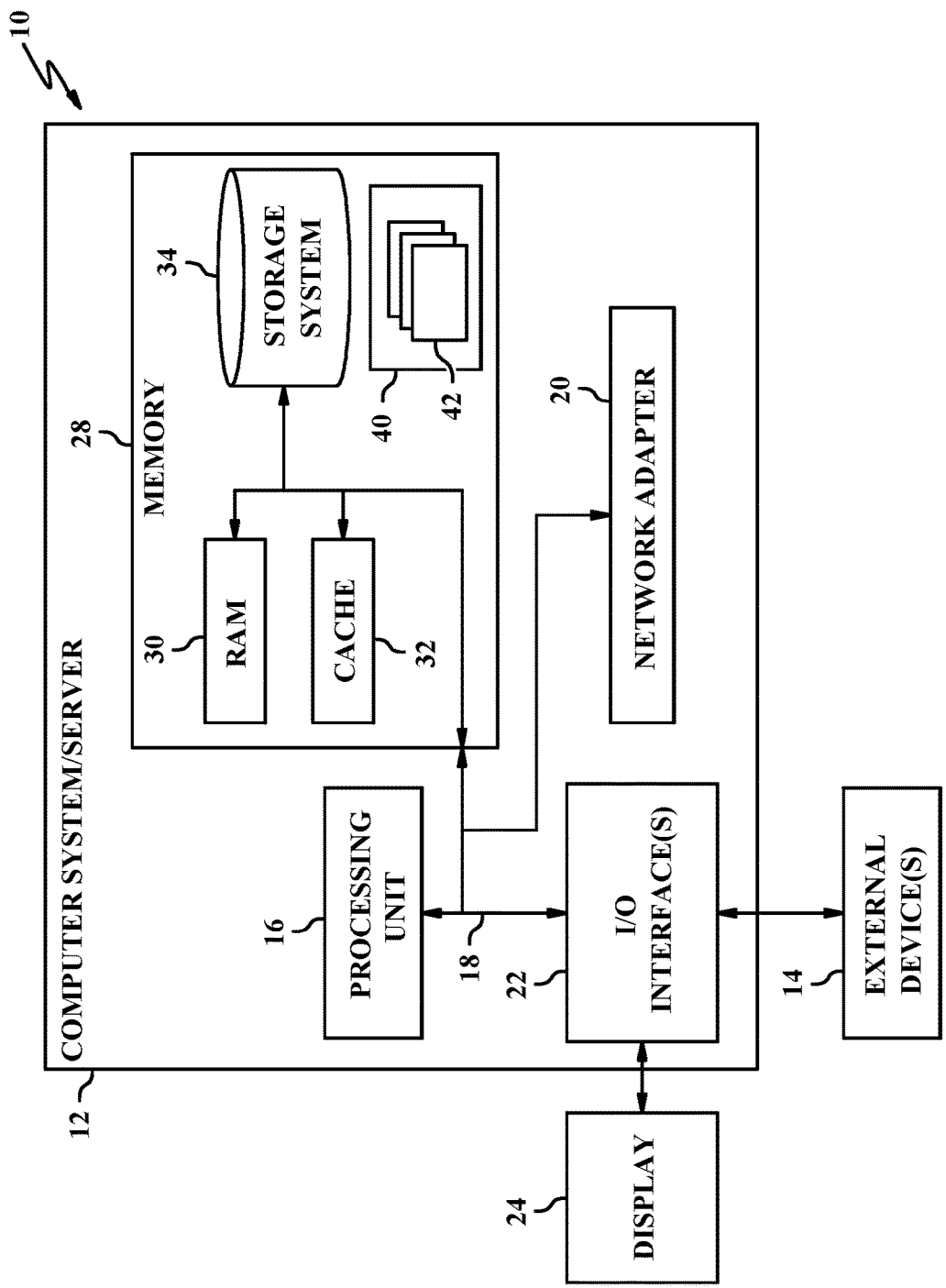
FIG. 8 is a block diagram of a cloud computing node, according to embodiments.

Consistent with some embodiments, the user devices 102, 104, and/or the server(s) 114 may be configured the same as or analogous to the computer system/server 12 as illustrated in FIG. 8. In some computing environments, more or fewer components may be present than illustrated in FIG. 1. For example, the user 116 may have access to an additional user device.

The user device 102 and/or 104 may establish a connection or communicate with the server(s) 114 via the network 108, which may be any suitable network such as, a local area network (LAN), a general wide area network (WAN), and/or a public network (e.g., the internet).

The user 116 may have access to at least user device 102 and 104. The user devices 102 and/or 104 may be any user device, such as a mobile phone, a laptop computing device, a tablet, a smart watch, or any other suitable device, such as those described in FIG. 8. The user device 102 includes a text prediction module 106 and the text dictionary 110. The text prediction module 106 may be a module (e.g., program instructions) that is responsible for predicting and/or suggesting what set of (i.e. one or more) characters a user will input. For example, a graphical user interface (GUI) may include the text prediction module 106. When the user accesses the GUI, the user may input (e.g., type, speak) a couple letters of a word. In response, the text prediction module 106 may predict what word(s) the user will or is trying to input. The GUI may then present each word as candidate words to the user for input.

The Text dictionary 110 or any other "dictionary," "text dictionary," or "word database" as described herein may refer to a list of one or more character combinations (e.g., language words, numbers, alphanumeric combinations, and/or symbols) that a text prediction module analyzes in order to predict and suggest strings to a particular user. Each character combination may include one or more individual/set of characters (e.g., letters, numbers, symbols, etc.). Each dictionary may be generated in various manners. For example, the text dictionary 110 may be populated via a remote data store that includes each word as found in the English language and transmits each word to the user device 104. In some embodiments, the user 116 may also tailor or customize his/her own strings, such as acronyms, slang words, etc. by entering such words into the text dictionary.

FIG. 1 illustrates at least that the user device 102 may obtain the target string(s) 120 that are displayed to the user device 104 via the user device targets strings data store 112. The term "target string(s)" or "target character(s)" as disclosed herein may refer to any character or combination of characters (e.g., letters, words, numbers, symbols) that is stored to, displayed on, and/or has been historically inputted to a particular user device that another user device requests to obtain for text prediction. In some embodiments, target string(s) may refer to any character(s) that is not initially located in any device dictionary of a user for text prediction. In an illustrative example, the user device 104 includes a display 150 that displays the target string(s) 120. The user device 104, at a first time, may obtain the target string (e.g., via Object Character Recognition (OCR)), as described in more detail below. The user device 104 may then, at a second time, transmit the target string(s) 120 to the server(s) 114 (e.g., via the network 108). The server(s) 114 may then store the target string(s) within the user device target strings data store 112. The server(s) 114 may be any suitable computing device(s), such as a database server, blade server, and/or any other suitable computing device, such as those described in FIG. 8.

At a third time, the user device 102 may then transmit a request to the server(s) 114 to obtain the target string(s) 120. In response, the target string(s) 120 may be transmitted from the user device target strings data store 112 to the user device 102, via the network 108.

Figure 2:
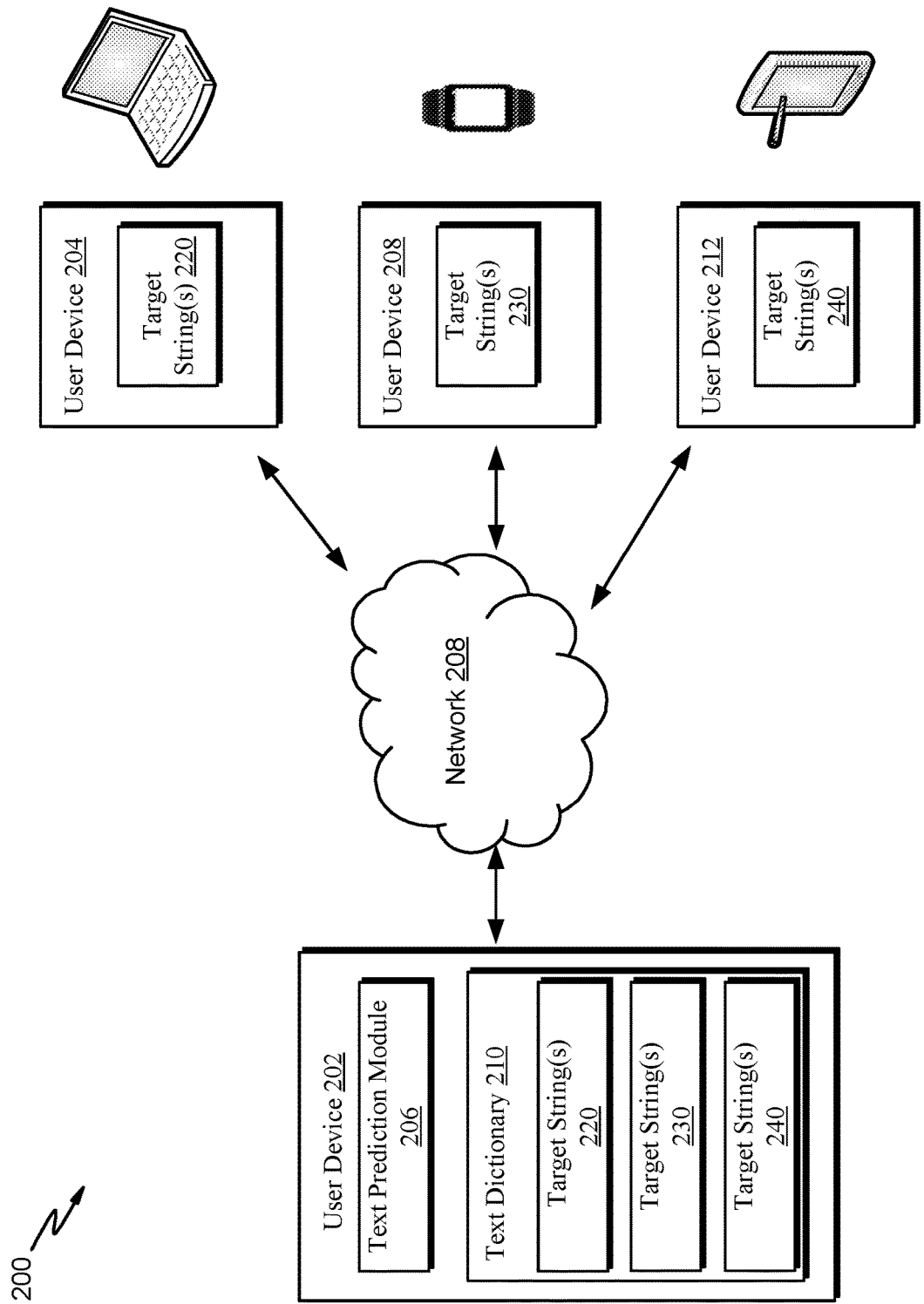
FIG. 2 is a block diagram of a computing environment, according to embodiments.

FIG. 2 is a block diagram of a computing environment 200, according to embodiments. FIG. 2 illustrates a particular manner in which target strings may be obtained by a user device. The computing environment 200 includes the user device 202, the user device 204, the user device 208, and the user device 212, each of which are communicatively coupled via the network 208.

The user device 202 includes the text prediction module 206 and the text dictionary 210. As illustrated in FIG. 2, in some embodiments, user devices may be queried directly instead of or in addition to a querying a remote server (e.g., the server(s) 114 of FIG. 1) to obtain target string(s). For example, the user device 202 may transmit a request and receive the target string(s) 220, 230, and 240 directly from their respective user devices 204, 208, and 212. The network 208 may be any suitable network, such as a Personal Area Network (PAN) (e.g., a Bluetooth® network), Wi-Fi (IEEE 802.11) network, a Peer-to-Peer network, etc.

Figure 3:
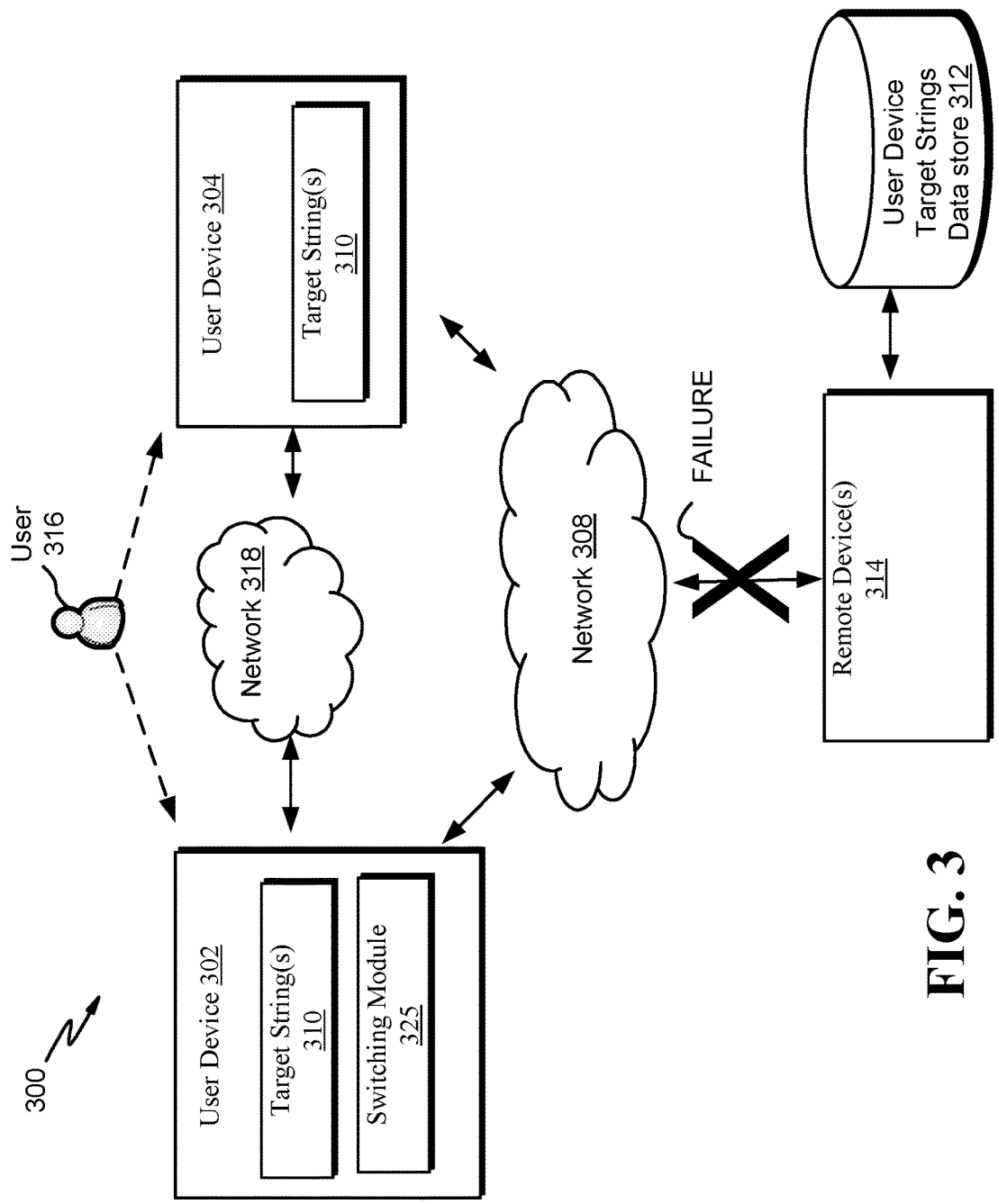
FIG. 3 is a block diagram of a computing environment, according to embodiments.

FIG. 3 is a block diagram of a computing environment 300, according to embodiments. The computing environment 300 includes the user device 302, which is communicatively coupled to the user device 304 via the network 318. The user 316 may have access or own both of the user devices 302 and 304. Each of the user devices 302 and 304 are communicatively coupled to the remote device 314 and the user device target strings data store 312. In some embodiments, the computing environments 100 and/or 200 may be included in the computing environment 300 or vice versa.

FIG. 3 illustrates that upon a failure associated with a wireless connection between any one of the user device 304 or 302 and the remote device(s) 314 (e.g., a server computing device), a second connection may be established with another user device. For example, at a first time the target string(s) 310 may be transmitted from the user device 304 to the user device target strings data store 312 via the network 308. At a second time, the user device 302 may transmit a request to the remote device(s) 314 in order to retrieve the target string(s) 310 within the user device target strings data store 312. However, a communication failure associated with the network 308 may occur between the user device 302 and the remote device(s) 314. For example, the failure may be some network latency threshold value being met, or the remote device(s) 314 being inaccessible such that no session can be established, etc. When the switching module 325 (e.g., a failover module) detects the failure (e.g., by determining that a particular time period has passed without establishing a connection), another request to obtain the target string(s) 310 may be transmitted directly to the user device 304 via the network 318. In some embodiments, the request to obtain the target string(s) 310 may be made first to the user device 304 and if a failure occurs between the user device 304 and user device 302, the switching module 325 may route the request for the target string(s) 310 instead to the remote device(s) 314 to obtain the target string(s) 310.

Figure 4:
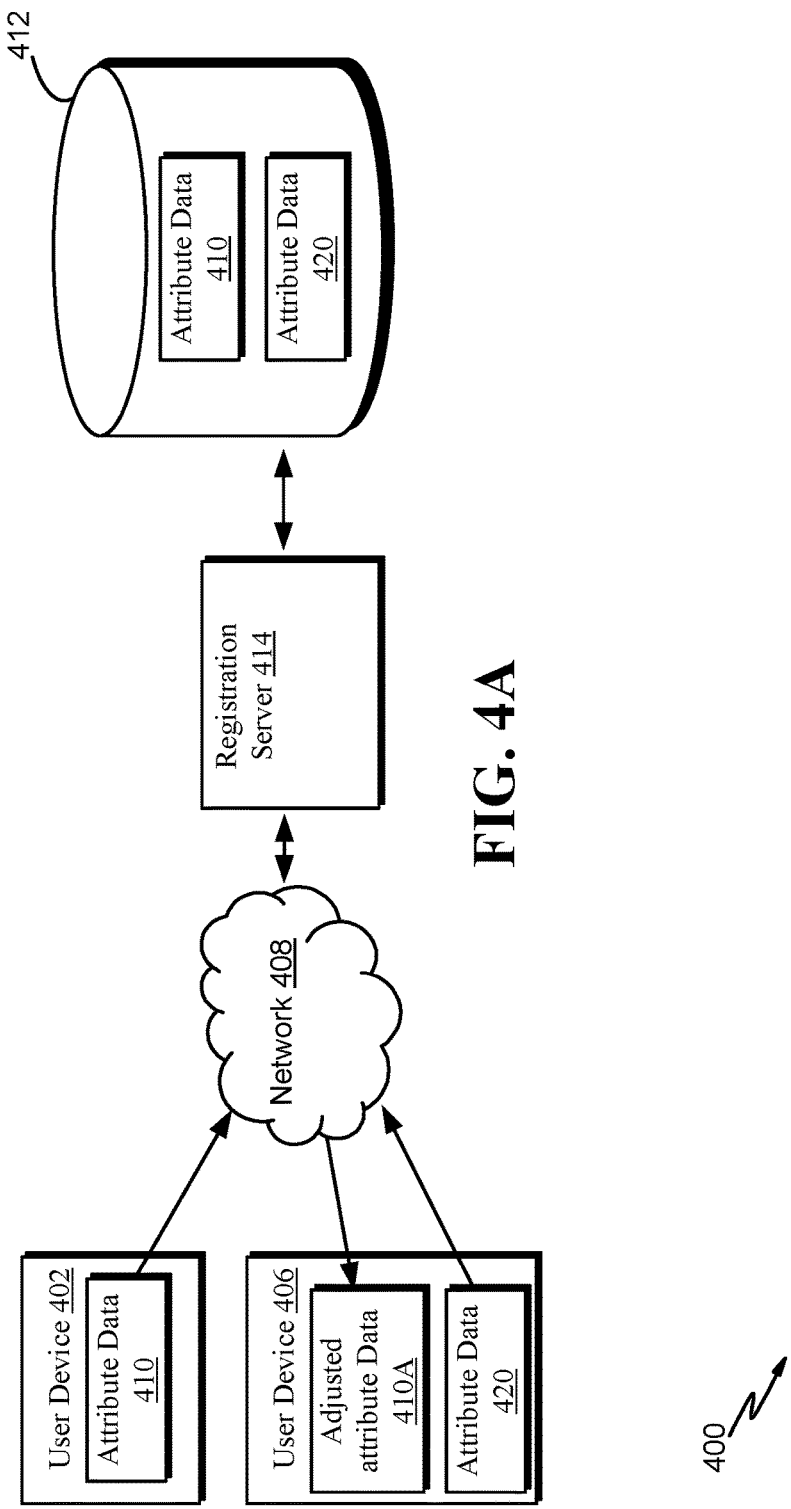
FIG. 4A is a block diagram illustrating the registration of attribute data and receiving of adjusted attribute data, according to embodiments.
FIG. 4B is a table representing at least some of the attribute data of FIG. 4A, according to embodiments.

FIG. 4A is a block diagram illustrating the registration of attribute data and receiving of adjusted attribute data, according to embodiments. The attribute data 410 and 420 may include target string(s) and/or metadata associated with particular target string(s). Accordingly, instead of or in addition to target string(s) solely being transmitted and received (e.g., the user device 102 of FIG. 1 receiving the target string(s) 120), the attribute data 410 may be transmitted and/or received. In some embodiments, aspects of FIGS. 4A and 4B may be included within the computing environments 100, 200, and/or 300. At a first time, the user device 402 may accumulate and transmit the attribute data 410 to the registration server 414 via the network 408. The registration server 414 may then store the attribute data 410 within the data store 412, which may be the user device target strings data store 112 or 312 of FIG. 1 or 3. At a second time, the user device 406 may accumulate and transmit the attribute data 420 to store the attribute data 420 within the data store 412. At another time, the user device 406 may transmit a request to the data store 412 in order to receive the adjusted attribute data 410A, which is described in more detail below.

In some embodiments, the attribute data 410 and/or 420 is collected actively (e.g., provided by the user device 402/application), which is described in more detail below. In some embodiments, the attributes may be collected passively (e.g., derived by a server from a client-side script (e.g., JavaScript)). For example, browser details that uniquely identify plugins and other device information may be collected from JavaScript and queried by the registration server 414. For example, the registration server 414 may query the user device 402 to obtain various characteristics about the user device 402 via a session web browser and scripting language (e.g., JavaScript) of the client device 402. In some embodiments, the registration server 414 may send the user device 402 and/or 406 a secure cookie such that session details and a client device fingerprint are obtained.

In various embodiments, the attribute data 410 and/or 420 is transmitted to the registration server 414 in an automated fashion (e.g., as a background task via the operating system) or transmission of the data 410 and/or 420 may occur in response to a request, wherein a user provides the attributes. This transmission of the attribute data 410 and/or 420 may occur upon installation/configuration/launch of an application, particular events (e.g., at boot up time), and/or a particular time intervals (e.g., every 5 minutes). In like manner, the attribute data 410 and/or 420 may be updated within the data store 412 in response to the installation/configuration/launch of an application, particular events, and/or a particular time intervals. Accordingly, the user device 402 and/or 406 may transmit attribute data at various times to the data store 412 depending on the policy implemented.

FIG. 4B is a table 400 representing at least some of the attribute data 410 and 420 of FIG. 4A, according to embodiments. The table 400 may correspond to one or more table data object as found within a database. The table 400 includes various fields (columns) such as, time stamp, display/cookie data, geolocation, eye tracking data, current word database, word frequency and learning policies. The "device" field may correspond to a device ID (e.g., an International Mobile Equipment Identify (IMEI) identifier, Mobile Equipment Identifier (MEID) identifier, a device fingerprint, etc.). The "time stamp" field may indicate when (e.g., a clock time/date) particular data was gathered, transmitted and/or received. The time stamp data may useful for various text prediction policies. For example, if the attribute data 410 included display data within the last 5 minutes, then such data may be used for text prediction purposes. The "display/cookie data" field may include target string(s) located on a device that is outside of a text dictionary context. For example, it may include each word as currently displayed to the user device 402, and/or each word stored to a cookie file within the user device 402.

The "geolocation" field may correspond to one or more identifiers that indicate where the device 402 and/or 406 was located when a request was made to transmit/receive the attribute data 410 and/or 420. For example, the geolocation identifiers may be Global Positioning System (GPS) coordinates or indoor Beacon identifiers. Geolocation identifiers may be useful for using words for text prediction based on geographical coordinates. For example, if a user was near a particular land mark, particular words associated with the landmark may be populated in the "geolocation" field and used for text prediction. Therefore, the attribute data 410 may, for example, include GPS coordinates of where the user device 402 was located when the transmission of the attribute data 410 occurred. The adjusted attribute data 410A may include those words associated with the GPS coordinates and may be transmitted to the user device 406 in order to perform text prediction. The Adjusted attribute data 410A may be the attribute data 410 with more or fewer characters than the attribute data 410.

The "eye tracking data" field indicates the particular positioning of a user's eyes on a display screen for predictive text purposes. Eye tracking sensors measure eye movement activity. In some embodiments, a camera eye tracking sensor on a user device directs near-infrared light toward the center of the eye(s), which causes reflections at the cornea. These reflections (e.g., pupil center corneal reflection (PCCR)) may be tracked at various time intervals. These reflections may correspond to values that are populated in the "eye tracking data" field. Eye tracking data may be useful for pruning and/or adding words to a word database for text prediction. As used herein, "pruning" refers to reducing the size of decision trees or removing target string(s) from the predictive text scoring process. Pruning may have several unforeseen advantages within the text prediction context. For example, pruning may reduce network latency, save battery, etc. Pruning may be done in various contexts, such as eye tracking, differences in dictionaries, active/inactive windows, etc., which is discussed in more detail below. The granularity of where the user is looking may be at various levels, such as which word(s) (and/or numbers, symbols), sentence(s), paragraph(s), and/or window(s) a particular user is looking at. In an illustrative example of pruning within the context of eye tracking, the attribute data 410 may include each word that is displayed to the user device 402. However, it may be determined (e.g., by the registration server 414) based on the eye tracking data, that the user was only looking at a particular sentence of the display data. Accordingly, each word from the display may be pruned, except for the particular words of the sentence, which may be transmitted back to the user device 402 and/or 406 as the adjusted attribute data 410A for text prediction scoring.

The "word database" field indicates a current text dictionary of a user device at the time of transmission/receiving of the attribute data 410. The "word frequency" field indicates how many times a particular word and/or character combination is found on a particular user device for text prediction purposes. The frequency that a word/character combination is utilized may indicate the likelihood that a user will use that word. For example, if a word is displayed a highest quantity of times to user device 402, it may be likely that the word will be used for text prediction for user device 406. "Learning policies" may include a history of actions performed by a device for learning purposes in a predictive text context (e.g., machine learning). For example, it may be determined (e.g., by a predictive text module within user device 406) that every time the user type a particular word/character combination, the user inputs a particular phrase 98% of the time. This information may be stored within the learning policies field.

In another illustrative of example of learning policies, the user device 406 may store another user device's text/image message that was sent to the user device 406. This information may be transmitted to the data store 412 in order to performing natural language processing (NLP), object recognition (e.g., for digital pictures), and/or machine learning analyses for predictive text scoring. Machine learning is the process of a computing device autonomously detecting patterns and/or associations in data and adjusting operations (e.g., scoring, ranking, recommending, etc.) accordingly.

In an illustrative example of how components of FIGS. 4A and 4B work, the user device 402 may first transmit the attribute data 410 to the data store 412. The attribute data 410 may include: a Device ID of the user device 402, a time stamp of the request, various strings associated with the user device 402, GPS coordinates at the time of transmission, information indicating where the user was looking on the user device 402 (eye tracking data), a current word database of the user device 402, a top candidate (or set of candidates) word that is displayed/inputted most frequently to the user device 402, and any learned policies. The user device 406 may then transmit a request to the data store 412 in order to retrieve at least a portion of the attribute data 410 and/or store some of its own data (e.g., attribute data 420) to the data store 412 for text prediction. For example, the request by the user device 406 may include its own time stamp information, GPS coordinates, current word database, word frequency information, and/or its own learning policies.

The registration server 414 may, for example, transmit the target strings that are/were displayed on the user device 402 to the user device 406. In addition or instead, the registration server 414 may store information associated with the GPS coordinates (e.g., the name of a restaurant) and transmit corresponding string(s) to the user device 406 for use in text prediction. The registration server 414 may additionally or instead analyze the eye tracking information transmitted from the user device 402 and responsively transmit one those strings in an area looked at by a user on a display of the user device 402. Instead of or in addition, the registration server 414 may compare the word databases of each user device. The registration server 414 may then prune those words out that are shared/identical between the two devices and only transmit those strings to the user device 406 that the user device 406 does not have in its own library. Instead of or in addition, the registration server 414 may identify/ determine a highest ranking candidate word that was displayed at a highest frequency on user device 402. The registration server 414 may then transmit this word to the user device 406 for use in text prediction scoring. In addition or instead the registration server may analyze learned policies from a user device and transmit one or more strings based on this information. For example, the user device 406 may have recently received image data of a car from another user. This image data may then be transmitted to the registration server 414 such that the registration server 414 may run an object recognition algorithm to identify what the image data is. The identification and/or strings associated with the image data ("car") may then be transmitted back to the user device 406 for text prediction scoring.

Figure 5:
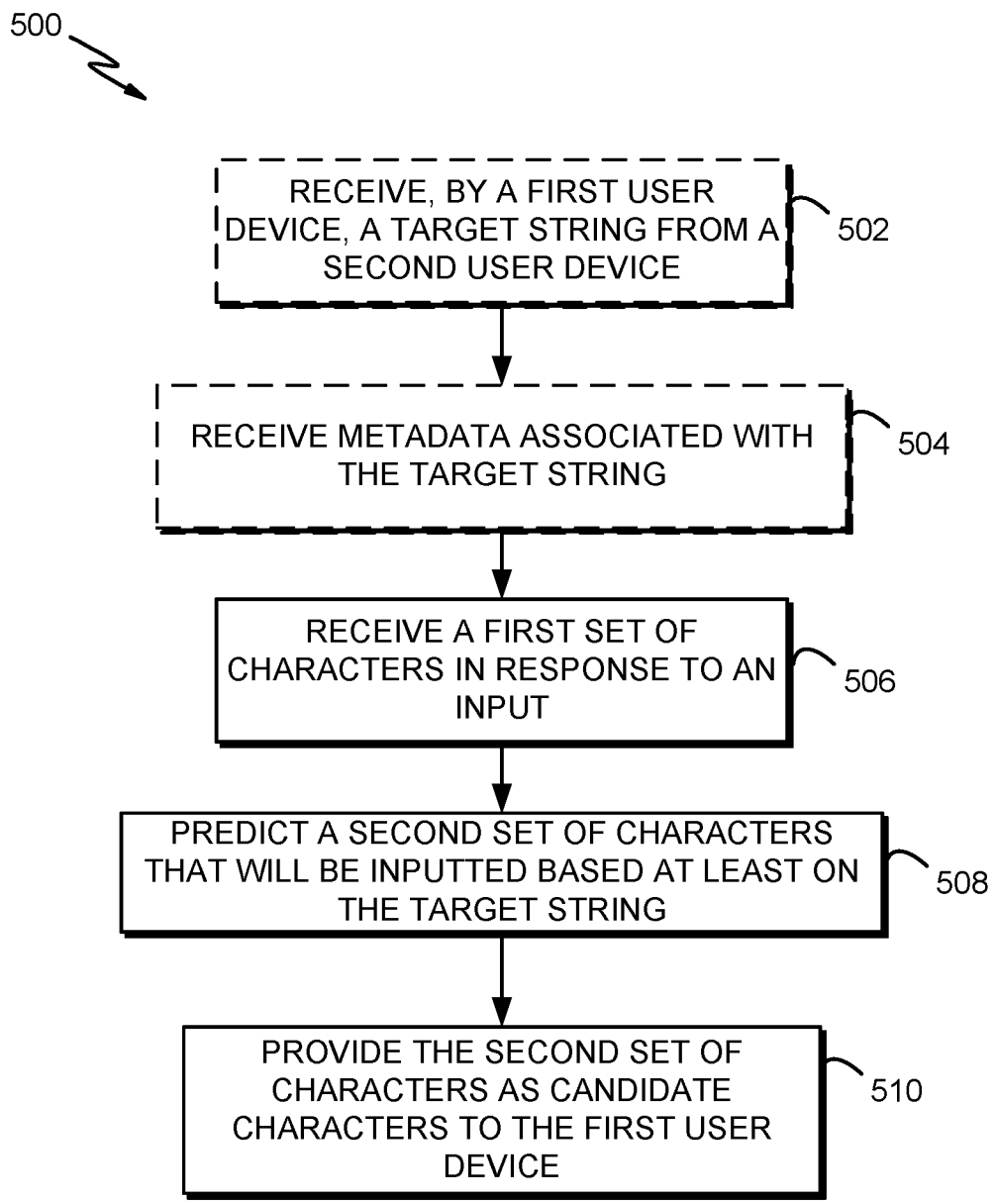
FIG. 5 is a flow diagram of an example process for text prediction using two user devices, according to embodiments.

FIG. 5 is a flow diagram of an example process 500 for text prediction using two user devices, according to embodiments. It is to be understood that FIG. 5 is discussed by way of illustration only. Thus, for example, more user devices may be present. The process 500 may begin at block 502 when a first user device receives a target string from a second user device. In some instances, the target string may be displayed to the second user device but not be located in the second user device's text dictionary. For example, the string may be displayed to particular windows corresponding to particular web pages. In particular embodiments, Object Character Recognition (OCR) algorithms may utilized on the characters displayed to the second user device and then transmitted back to the first user device for use in text prediction. For example, a set of text such as a password or other authentication string (e.g., a OTP) may be displayed at the second user device and a user may need to re-enter the password on the first user device. The operating system or an application (e.g., a web browser) may then run OCR algorithms. For example, first an image/snapshot, which includes the password, may be taken of the screen. The image may then be scanned and one or more characters of the password may be identified (e.g., via pattern recognition and/or feature extraction algorithms). The one or more characters may then be converted to a second set of characters based on the identifying (e.g., converting the characters to American Standard Code (ASC) II). The second set of characters may then be associated with the password and then transmitted back to the first user device such that a text dictionary within the first user device is updated for use in text prediction. In some embodiments, object recognition or other recognition algorithms may be used for digital images or icons for use in text prediction. For example, the first or second user device may intelligently scan recent text messages and recognize one or more EMOJI characters (e.g., a smiley face icon) for use in text prediction.

In some embodiments, other mechanisms may be utilized instead of or in addition to OCR or object recognition methods to obtain characters from the second user device. For example, a module within an operating system kernel may obtain text from the second user device. In another embodiment, a particular application itself may gather the text. In an illustrative example, an application of the first user device may request words or context information about a particular application that is running on the second user device. The particular application's Application Programming Interface (API) may then receive and route this request to the particular application. The particular application may give the API information about what the application concerns, particular words associated with the application, etc. The API may then route this information back to the first user device.

In some instances, the target string may not necessarily be displayed but stored in various locations of the second user device, such as a cookie file. The cookie file may store important information not contained in a text dictionary, such as user-generated passwords corresponding to authentication and authorization for functions of particular websites. Accordingly, in some embodiments, the first user device may obtain this cookie data from the second user device. In some embodiments, a history of characters that a user has typed may be logged (e.g., via key logging modules) and stored to a particular file within the second user device such that the information contained in the particular filed can be queried and obtained from the first user device and used for text prediction.

In some embodiments, block 502 may occur at various points in time and through automated or user requested means. For example, at boot-up time or particular time intervals, the first user device may be configured to query the second user device (e.g., via the network 208 of FIG. 2) and as a background task (e.g., automated without user intervention) at the first user device. Accordingly, the first user device's text dictionary may be updated periodically with characters associated with the second user device. In some embodiments, block 502 may occur at run-time. For example, in response to initiating access (e.g., opening, installing, and/or inputting character(s)) to a text-entry application (e.g., a SMS text message application) within the first user device, an automated wireless connection (e.g., via the network 208) may be established between the first user device and the second user device. In response to the establishing of this connection, a target string may be received from the second user device such that the target string may then be used for text prediction by the first user device. In run-time embodiments, block 502 (and 504) may occur, for example, after block 506.

In some embodiments, the first user device may not receive the target string directly from the second user device as illustrated in block 502. Rather, the target string may be retrieved from a central data store (e.g., the user device target strings data store 112 of FIG. 1). And as discussed above, the receiving of the target string(s) from the data store may occur by automated, run-time, and/or user requested means at any particular time interval or boot up time.

In some embodiments, block 502 may be the result of the first user device requesting any string(s) associated with each of the other user devices that are nearby to the first user device, and the second user device may be the device that is near to the first user device. In embodiments, Bluetooth®, location services (Location-Based Services (LBS)), manual user registration or requests, and/or eye-tracking technology may be utilized to determine a device nearby to the first user device. For example, devices within a Bluetooth® signal strength threshold of the first user device may be queried. In another example, a user may register each of his/her devices (e.g., via the registration server 414 of FIG. 4) before a particular application may be accessed. Accordingly, when a user utilizes a text prediction application, a data store (e.g., the data store 412) may be queried to determine what devices a particular user owns in order to transmit a message to those devices to obtain data from them.

Per block 504, and in some embodiments, metadata associated with the target string may be received. The metadata may be any suitable type of metadata, such as one or more attributes as specified by the table 400 of FIG. 4. For example, a timestamp identifier corresponding to when the target string was received may be obtained. A geolocation identifier corresponding to where the second user device was located when the second user device transmitted the first target string may be obtained, etc.

Per block 506, a first set of characters may be received in response to an input. For example, a user of the first user device may activate a texting application and type two letters of a word within a GUI field of that application. Alternatively, the user may input a voice command segment of a word.

Per block 508, a second set of characters that will be inputted may be predicted (i.e., generating a character estimate) based at least on the target string. The prediction at block 508 may be performed by implementing and/or combining various text prediction algorithms. For example, a text prediction module (e.g., the text prediction module 106) located within the first user device may use natural language processing (NLP) mechanisms that use syntactic, semantic, and/or part of speech context of the first set of characters and tagging to predict the second set of characters. The text prediction module may instead of or in addition use frequency-based algorithms based on statistical data. For example, given a first set of words "I am . . . " there may be a statistically significant chance that the next word will be "going," and so this word would be used for prediction scoring. In another example, the top 10 words given a set of input characters (the first set of characters) a user has used in the past may be used as candidate characters. Further, out of a large corpus of data, the top 20% of words used by a plurality of individuals (e.g. within a social media group) may be selected given the first set of character input.

In some embodiments, the prediction at block 508 may include scoring or taking into account the target string(s) and/or metadata gathered from the second user device (and/or first user device) at block 502 and 504 respectively. For example, the prediction module may take into account various contextual data associated with the target string (e.g., the data within the table 400 of FIG. 4). In an example illustration, eye tracking metadata may specify that the user was looking at particular words within the second user device. Accordingly, those particular words may be transmitted and/or scored higher as candidate words to present to the user. In another example, it may be determined what application window on the second user device is active (e.g., the window that is currently being displayed). Predictive text scoring may include a rule that character(s) on an active window are more likely to be typed by a user. Accordingly, words from inactive windows, although gathered, may be pruned. This may include, for example, receiving (e.g., by the server(s) 114) information from a user device that helps identify that a first window of a plurality of windows is an active window currently displayed. The first window may be associated or mapped to a first set of characters that are displayed to the first window. A second set of characters displayed to a second set of windows may then be pruned such that the second set of characters are not used for text prediction. Accordingly, the first set of characters may be transmitted to the first user device.

Per block 510, the second set of characters may be provided to the first user device as candidate characters. For example, a password corresponding to authentication of a particular user may have only been entered and stored to the second user device. The passwords may have never been entered on the first user device. Within in a GUI, of the first user device, the user may type the first two characters of the password. In response to the predicting at block 508, the providing of the second set of characters as candidates may include displaying and presenting to user the rest of the password as a top ranked candidate for text prediction based on the first set of characters already inputted. Embodiments of the present disclosure, as illustrated above, may improve predictive text technologies, specifically by giving more robust candidate and/or text prediction scoring according to blocks 508 and/or 510.

Figure 6:
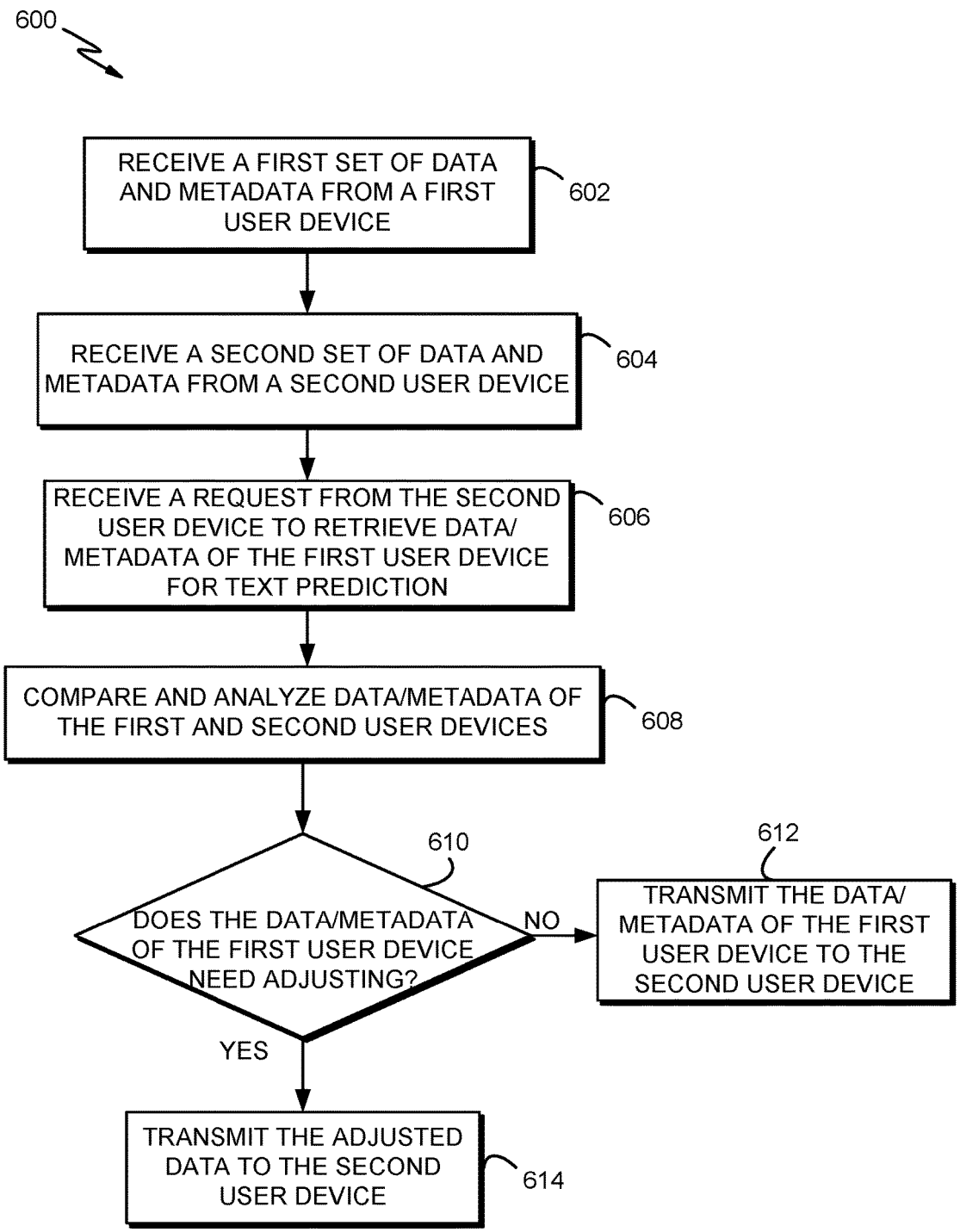
FIG. 6 is a flow diagram of an example process for analyzing sets of data from different user devices, according to embodiments.

FIG. 6 is a flow diagram of an example process 600 for analyzing sets of data from different user devices, according to embodiments. In some embodiments, the process 600 represents remote storage and analyzing by a non-user device entity. For example, the process 600 may represent an algorithm that the server(s) 114 and user device target string(s) data store 112 perform in order to store and transmit data according to a user device request.

The process 600 may begin at block 602 when a first set of data (e.g., a target string) and metadata from a first user device is received (e.g., by the user device target string(s) data store 112). Per block 604, at a second time, a second set of data and metadata may be received from a second user device. For example, the table 400 that is populated may include various units of information concerning the user device 402 and user device 406.

Per block 606, a request from the second user device may be received to retrieve the data and/or metadata of the first user device for use in text prediction processes. For example, the receiving of the target string at block 502 in FIG. 5 may be in response to transmitting a request for the target string.

Per block 608, the data and/or metadata from the first and/or second user devices may be compared and/or analyzed. For example, referring back to FIG. 4B, the word databases of both the user device 402 (the first user device) and the user device 406 (the second user device) may be compared to determine whether the first user device includes words that are not within the second user device's word database, for pruning purposes as described above. In another example, eye tracking data may be analyzed concerning the user device 402, for pruning purposes, as described above.

Per block 610, it may be determined whether the data and/or metadata of the first user device needs adjusting for purposes of transmitting data to the second user device (or implementing text prediction). Adjusting may include adding and/or subtracting the target strings and/or metadata received from the first and/or second user device for transmission purposes (e.g., the adjusted attribute data 410A of FIG. 4). For example, using the illustration at block 608 above, if it is determined that the first user device includes a first set of words that are not within the second user device's word database, and a second set of words that are within the second user device's word database, the second set of words may be pruned as possible candidate words for text prediction. Accordingly, only the first set of words may be transmitted to the second user device for candidates using text prediction. Thus, block 614 may occur such that the adjusted data may be transmitted to the second user device. In another example using the illustration at block 608, each word on the first device's display screen may be transmitted to the data store 412 of FIG. 4. However, after analyzing the eye tracking data, suggesting that the user was only looking at a portion of the display screen, the words that the user was not looking at according to the eye tracking data may be pruned for text prediction purposes.

Per block 612, if the data and/or metadata of the first user device does not need adjusting, the data and/or metadata of the first user device that was originally received may be transmitted to the second user device. In some embodiments, the process 600 may include performing text prediction (e.g., block 508 of FIG. 5), such that only a set of candidate characters will be transmitted and presented to the user after text prediction.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
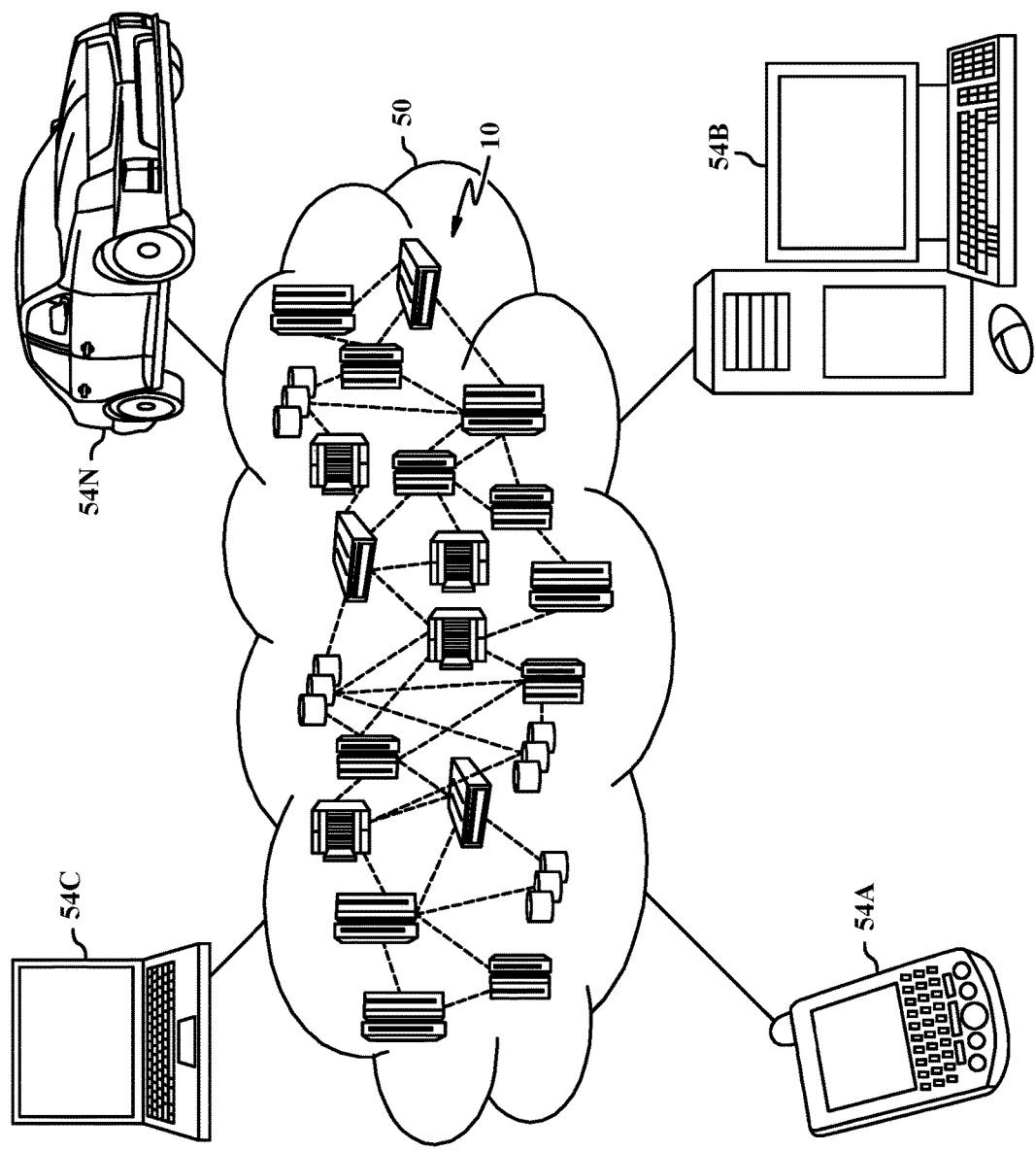
FIG. 7 depicts a cloud computing environment according to embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a schematic of an example of a cloud computing node (or user computing device, such as user computing device 102) is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device, which is not to be construed necessarily by one of ordinary skill in the art as a generic computer that performs generic functions. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
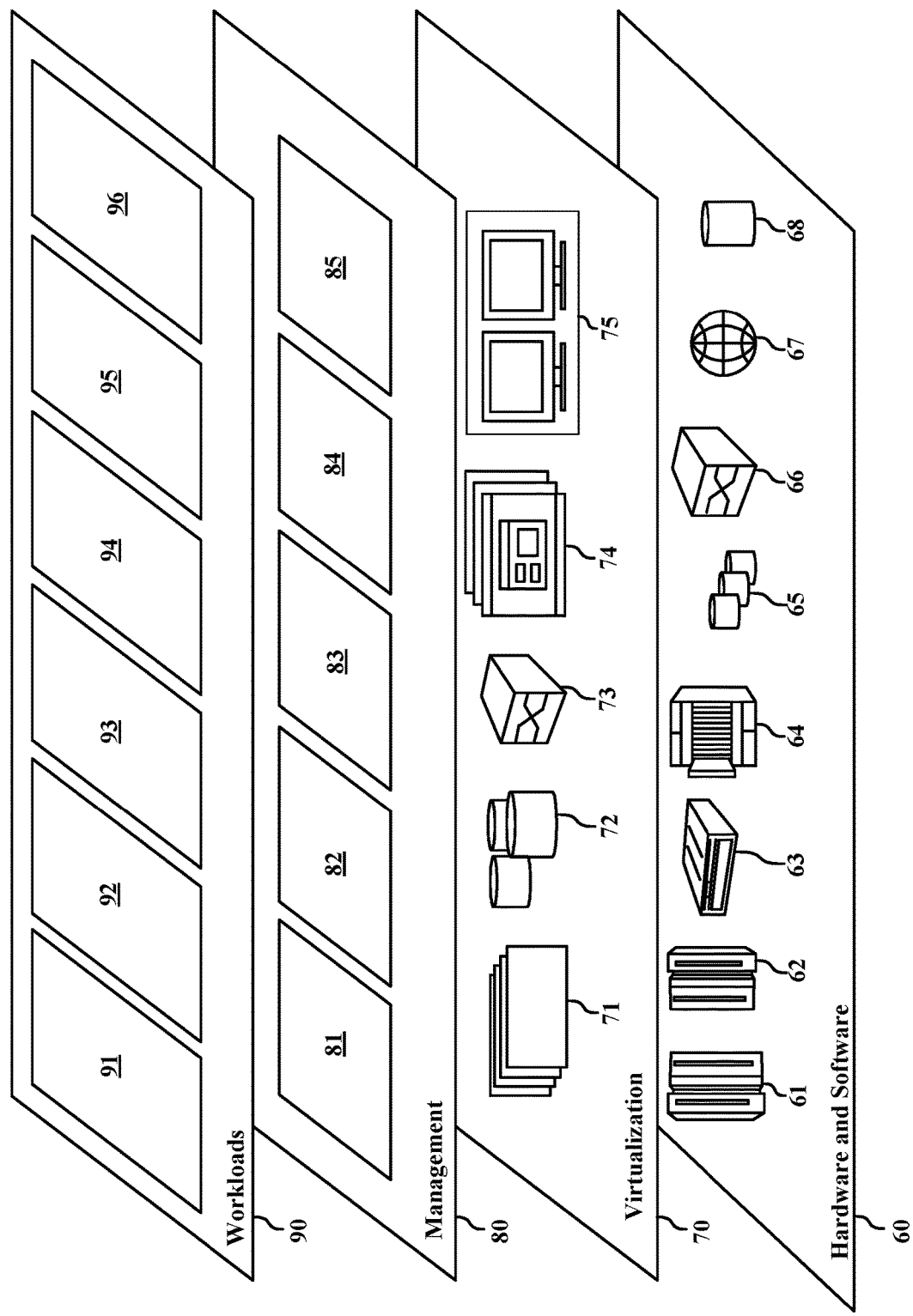
FIG. 9 depicts abstraction model layers according to embodiments.

Referring now to FIG. 9, a set of functional abstraction layers provided by cloud computing environment 50 (FIG. 7) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text prediction 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a computing device having a processor; and
   a computer readable storage medium having program instructions embodied therewith, the program instructions executable by the processor to cause the system to perform a method, the method comprising receiving, over a network and by a first user mobile device, a first target string and a set of metadata associated with the first target string from a data store, the first target string being transmitted from a second user device to the data store;
   transmitting, over the network and by the first user mobile device, a first text dictionary to the data store, wherein the second user device transmits a second text dictionary to the data store, and wherein it is determined that the second text dictionary includes one or more words that the first text dictionary does not include;
   displaying, by the first user mobile device, a first set of one or more characters in response to a Short Message Service (SMS) text input of a user;
   predicting, by the first user mobile device, a second set of one or more characters that the user will input, the predicting includes:
      analyzing the set of metadata associated with the first target string, the analyzing of the set of metadata includes analyzing: a timestamp identifier corresponding to when the first target string was transmitted, a geolocation identifier corresponding to where the second user device was located when the second user device transmitted the first target string, eye tracking data associated with the second user device, and a word most frequently displayed to the second user device, wherein the eye tracking data corresponds to what particular words of the plurality of words the user was looking at on the second user device, wherein the predicting is further based on the particular words the user was looking at on the second user device, wherein at least some of the second set of one or more characters includes at least some of the particular words,
      pruning a second set of words of the plurality of words that the user was not looking at, wherein the particular words that the user was looking at are transmitted to the first user mobile device and the second set of words that the user was not looking at are not transmitted to the first user mobile device,
      receiving, in response to the determining that the second text dictionary includes one or more words that the first text dictionary does not include, the one or more words from the second text dictionary, wherein at least some of the second set of one or more characters includes at least some of the one or more words,
      identifying that a first window of a plurality of windows on the second user device is an active window that is currently displayed on the second user device,
      associating the first window with a third set of characters that are displayed to the first window, wherein at least some of the second set of one or more characters include at least some of the third set of characters,
      pruning a fourth set of characters associated with a second set of windows of the plurality of windows, wherein the fourth set of characters are not used for the prediction, transmitting, in response to the pruning of the fourth set of characters, the third set of characters from the second user device to the first user mobile device for the text prediction, and displaying, in response to the predicting, the second set of characters to the first user mobile device.

\* \* \* \* \*